(12) United States Patent
LaForest

(10) Patent No.: US 8,746,607 B2
(45) Date of Patent: Jun. 10, 2014

(54) CABLE HANDLING SYSTEM

(75) Inventor: Omer LaForest, Alma (CA)

(73) Assignee: 9019-8813 Quebec Inc., Alma Quebec (CA)

( * ) Notice: Subject to any disclaimer, the term of this patent is extended or adjusted under 35 U.S.C. 154(b) by 405 days.

(21) Appl. No.: 13/049,077

(22) Filed: Mar. 16, 2011

(65) Prior Publication Data

US 2011/0226884 A1   Sep. 22, 2011

Related U.S. Application Data

(60) Provisional application No. 61/314,745, filed on Mar. 17, 2010.

(51) Int. Cl.
B65H 59/18 (2006.01)

(52) U.S. Cl.
USPC ..... 242/418; 242/361.4; 242/557; 242/564.4; 242/128

(58) Field of Classification Search
CPC ......... B65H 51/08; B65H 75/364; H02G 1/06
USPC ........ 242/360–363, 388.9, 564.3, 588, 588.3, 242/588.6, 128, 419.6, 419.7, 153–154, 242/418, 418.1, 564.4, 557; 226/4, 90, 91, 226/100, 108, 177, 189, 183, 186, 187, 25
See application file for complete search history.

(56) References Cited

U.S. PATENT DOCUMENTS

| | | | |
|---|---|---|---|
| 2,936,509 A | 5/1960 | Martin et al. | |
| 2,947,494 A | 8/1960 | Merritt et al. | |
| 2,959,279 A | 11/1960 | Krafft et al. | |
| 3,024,157 A | 3/1962 | Beerli | |
| 3,448,962 A | 6/1969 | Miller | |
| 3,478,984 A | 11/1969 | Landsem | |
| 3,645,463 A | 2/1972 | Helm | |
| 3,682,410 A | 8/1972 | Rinearson | |
| 3,703,980 A | 11/1972 | Bright | |
| 3,776,519 A | 12/1973 | Hamilton | |
| 4,145,014 A * | 3/1979 | Chatard et al. | 242/390.9 |
| 4,258,834 A * | 3/1981 | Hawley et al. | 191/12.2 R |
| 4,523,724 A | 6/1985 | Rérolle | |
| 4,535,946 A | 8/1985 | Thevenon | |
| 4,570,245 A | 2/1986 | Thigpen | |
| 4,635,875 A | 1/1987 | Apple | |
| 4,695,038 A | 9/1987 | Giroux | |
| 4,728,079 A | 3/1988 | Nitta et al. | |
| 4,821,935 A | 4/1989 | Caroselli | |

(Continued)

FOREIGN PATENT DOCUMENTS

| | | |
|---|---|---|
| EP | 1726375 A1 | 11/2006 |
| WO | 2007012476 A1 | 2/2007 |

*Primary Examiner* — William E Dondero
(74) *Attorney, Agent, or Firm* — Scott A. Felder; Wiley Rein LLP

(57) ABSTRACT

A cable handling system has a cable traction unit having a sequence of cable-driving pulleys, a cable path coiling partially around each one of the cable-driving pulleys in the sequence, the cable traction unit being mounted on a rear portion of the vehicle; a cable accumulator unit mounted on the vehicle, having an cable chamber fixed relative to the vehicle and having an annular cable receiving area between a cylindrical outer wall and a cylindrical inner wall, and a cable channel having a first end communicating with the cable traction unit, and a second end communicating with the annular cable receiving area.

5 Claims, 4 Drawing Sheets

(56) References Cited

U.S. PATENT DOCUMENTS

| | | |
|---|---|---|
| 4,828,223 A | 5/1989 | Russell et al. |
| 4,836,503 A | 6/1989 | Giroux |
| 5,485,973 A | 1/1996 | Nellessen, Jr. |
| 5,624,207 A | 4/1997 | Berges |
| 6,019,303 A | 2/2000 | Cooper |
| 6,431,481 B1 | 8/2002 | Neumann et al. |
| 7,004,419 B2 | 2/2006 | Hsu |
| 2006/0186164 A1* | 8/2006 | Heidel et al. ............ 226/108 |

* cited by examiner

CABLE HANDLING SYSTEM

CROSS-REFERENCE TO RELATED APPLICATIONS

This application claims the benefit of U.S. provisional application No. 61/314,745, filed Mar. 17, 2010, the contents of which are hereby incorporated by reference as though fully set forth herein.

FIELD

The specification relates to systems for handling cable, and more specifically describes a system that includes a cable traction unit and a cable accumulator that can be mounted on a vehicle or used independently from one another.

BACKGROUND

Various industrial applications require traction cables. Often, network cables such as electric or optical cables are pulled into place in a tunnel by first passing a metal cable through the tunnel, attaching the metal cable to the network cable, and the network cable is pulled into position by retracting the metal cable. For illustrative purposes, a typical industrial application can have a cable traction capacity of 25 000 lbs, 50 000 lbs, or even more, for instance. Depending on the application, the length of the cable can vary.

It was known to handle cable by loading the cable on a large drum mounted to rotate about a horizontal axis. The drum was driven by a hydraulic actuator which exerted a rotary force on the axle of the drum. Similar to the operation of a common winch, the cable was to be unloaded from the drum by manual force traction the free end thereof. Once attached to that which required traction, the cable is reeled in by the hydraulically actuated drum. In such systems, the drum serves both as means to accumulate the cable and means to pull the cable.

Such known systems were satisfactory to a certain degree, but there remained room for improvement. For instance, there was a challenge in adapting the traction force exerted on the drum both because the force exerted on the cable depended on the amount of cable present on the drum (i.e. for a given rotary force exerted on the axis, the cable force diminishes as the leverage arm separating it from the axis increases), and because it was difficult to obtain an indication of the actual traction force exerted at any given time. Further, the cable reeled on the drum tended to exert twisting forces which strongly affected the ability of forming a regular spiral configuration on the drum and sometimes caused the cable to become jammed. In an attempt to compensate for some of these drawbacks, it was often required that an operator hold a portion of the cable during rotation of the drum, which was undesirable.

SUMMARY

In accordance with one aspect, there is provided a cable handling system which has separate cable traction unit and cable accumulator unit.

In accordance with another aspect, there is provided a cable fraction unit having a sequence of cable-driving pulleys all disposed on a common plane. A pressing wheel can be used to exert a locking pressure to press a cable section against a cable entry pulley.

In accordance with another aspect, there is provided an accumulator which has a fixed cylindrical chamber and a rotary hose which is turned as the cable is pushed through and accumulated into the chamber.

In accordance with another aspect, there is provided a cable accumulator comprising an fixed annular cable receiving chamber having a cylindrical outer wall and a cylindrical inner wall and a cable-supporting floor, and a cable channel having a rotary section with an aperture communicating with the annular cable receiving chamber, the rotary section being shaped and oriented so as to be automatically rotated when cable is pushed through the aperture to fill the annular cable receiving chamber.

In accordance with another aspect, there is provided a cable fraction unit having a sequence of cable-driving pulleys including two opposed end pulleys, the cable-driving pulleys being disposed on a common plane defining along it a winding cable path coiling partially around each one of the cable-driving pulleys in the sequence, the cable path having two ends, each end extending from a corresponding one of the two end pulleys.

In accordance with another aspect, there is provided a cable handling system for a vehicle, the cable handling system comprising: a cable traction unit having a sequence of cable-driving pulleys, a cable path coiling partially around each one of the cable-driving pulleys in the sequence, the cable traction unit being mounted on a rear portion of the vehicle; a cable accumulator unit mounted on the vehicle, having an annular cable receiving chamber fixed relative to the vehicle and formed between a cylindrical outer wall and a cylindrical inner wall, and a cable channel having a first end communicating with the cable traction unit, and a second end communicating with the annular cable receiving area.

In accordance with another aspect, there is provided a method of operating a cable traction unit having a sequence of cable-driving pulleys in a cable path, including two end pulleys in the cable path, and two end traction wheels, each being movable to press a portion of cable against a corresponding one of the end pulleys, the method comprising: obtaining a feeding direction for the cable along the cable path; moving the end traction wheel corresponding to the last cable-driving pulley in the cable path given the feeding direction, to press a portion of cable; rotating each of the cable-driving pulleys in an angular direction corresponding to the feeding direction for the cable.

DESCRIPTION OF THE FIGURES

In the appended figures.

DETAILED DESCRIPTION

Figure 1:
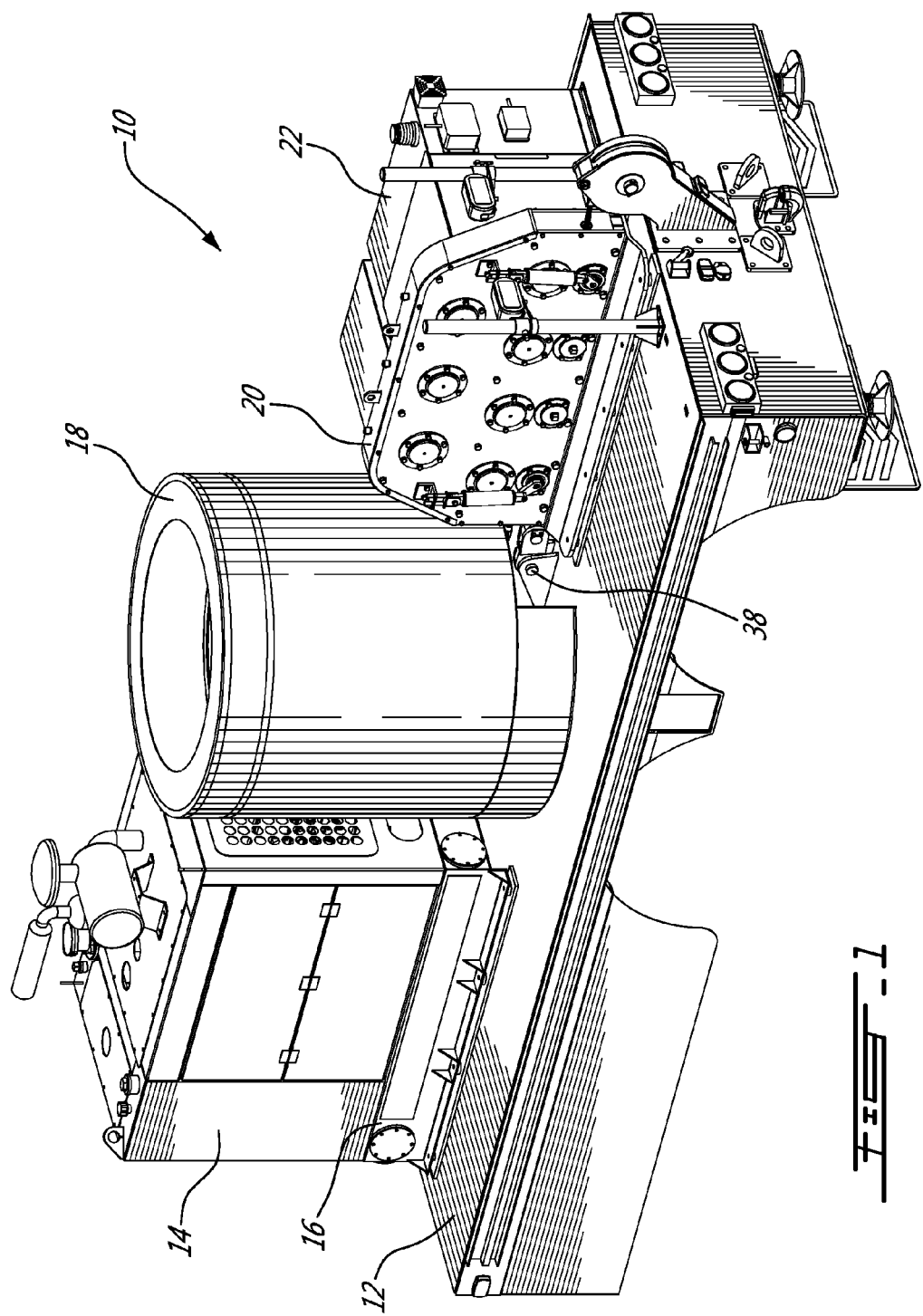
FIG. 1 is a perspective view showing an example of a cable handling system.

In FIG. 1, an example of a cable handling system is shown. In this example, the cable handling system 10 is mounted to a truck bed 12 although it will be understood that it can be used in alternate applications, and that portions or units thereof can be used independently or in sub-combinations. Generally, it can be seen that the cable handling system 10 in this example includes a power unit 14 having an integrated hydraulic fluid reservoir 16 at a lower portion thereof; a cable accumulation unit 18; a cable traction unit 20; and a controller unit 22. In this example, the cable traction unit 20 is used to feed cable out from the cable accumulation unit 18, and to pull the cable back in thereafter. The traction unit 20 is adapted to pull the cable up to relatively high tensions. The cable traction unit 20 is powered by hydraulics from the power unit 14, and its operation is controlled by the controller unit 22. It can be seen that these units are mounted to a rear portion, or bed 12 of a vehicle in a configuration adapted to feed cable from the rear end of the vehicle. The cable accumulation unit 18 is also fixedly mounted to the truck bed 12 and is positioned immediately adjacent the cable traction unit 20.

Figure 2:
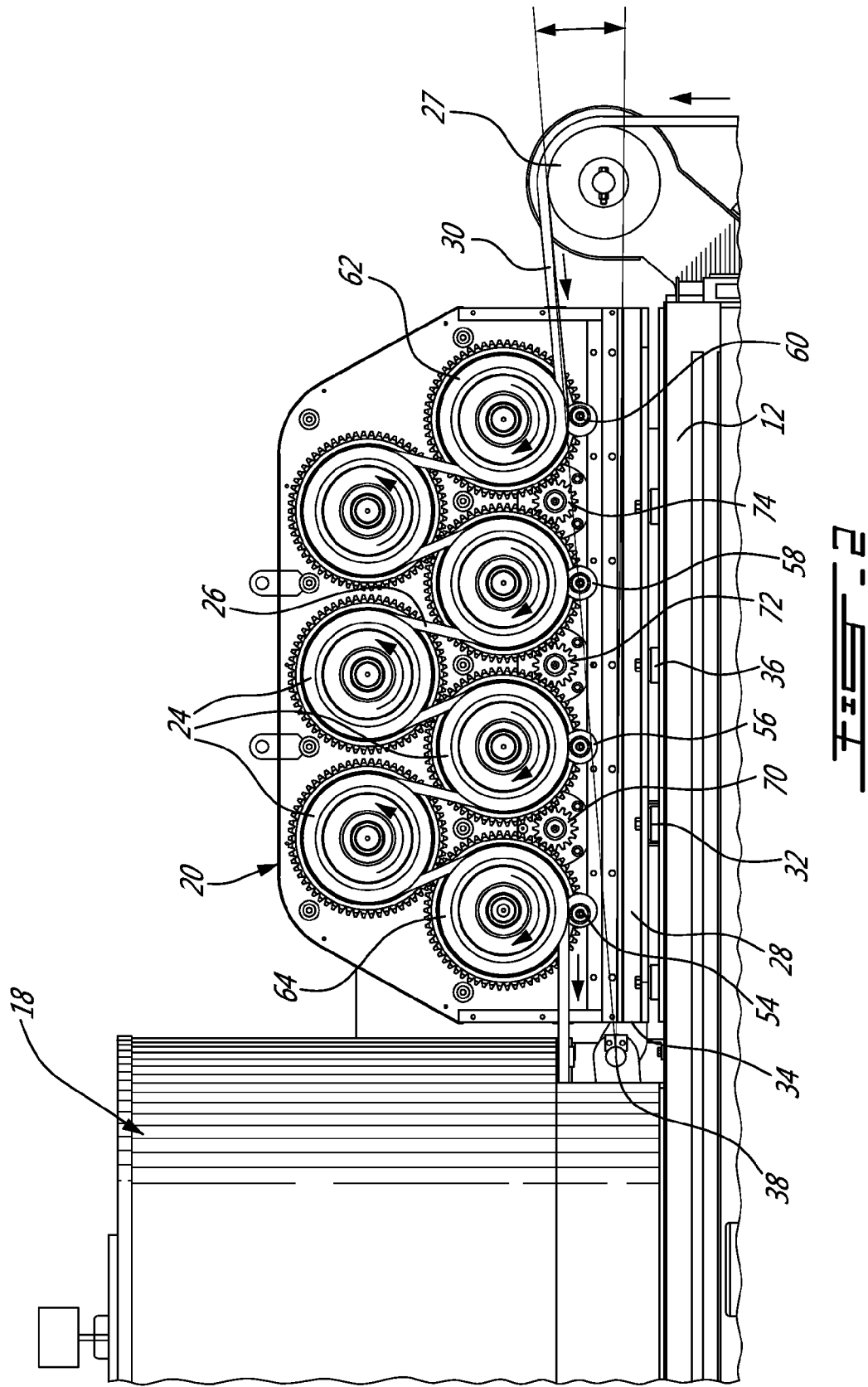
FIG. 2 is a side elevation view showing a traction unit of the cable handling system of FIG. 1.

In FIG. 2, the traction unit 20 is shown with components removed, to show the path of the cable 26. It will be seen that one particularity of the traction unit 20 is that it uses a plurality of cable-driving pulleys 24 in sequence, forming a cable path wrapping around more than half of a number of pulleys 24 in the sequence, to exert the pulling force on the cable 26. It can be used to exert a substantial pulling force in both directions, although in the particular configuration illustrated, its power will be understood to be mainly used for pulling cable back in and sending it into the accumulator unit. As can be seen, the cable path is winding and meander like, this allows the cable 26 to coil around a substantial portion of each one of the pulleys 24 in the sequence. As will be detailed below with reference to FIG. 3, the pulleys double up as gears which are intermeshed and ensure synchronized collective movement of the pulleys to pull the cable.

Still referring to FIG. 2, arrows are illustrated to schematically show the opposite directions in which successive pulleys are rotated to drive the cable 26 in a given direction. Further, a number of traction wheels 54, 56, 58, 60 are visible. These traction wheels 54, 56, 58, 60 are rotatable in a bearing which is also rotatable, though about an axis which is parallel but off-centered from the axis of rotation of the wheel. The bearings of the traction wheels can thus be rotated about the off-centered axis to bring the corresponding traction wheels into contact or out from contact with the cable. A purpose of the fraction wheels is to apply pressure onto the cable in a manner to make it grab onto the pulley for increasing friction of the pulley with the cable. This can particularly be useful to prevent the creation of slack in the cable within the traction unit and when replacing the cable for instance or when replacing a cable without opening the casing, as detailed below.

To ensure correct start-up of normal operation of the traction unit 20, a first step is to select a feeding direction for the cable. Of all the driving pulleys 24, two thereof are at opposite ends of the cable path. These will be referred to as the front end driving pulley 64 and the rear end driving pulley 62. In this embodiment, a respective one of these end pulleys is responsible for beginning the cable traction operation, depending on the direction in which the cable 30 is fed. More particularly, the end pulley which is responsible for beginning the traction operation is the one which corresponds to the exit end of the cable, i.e. the last one in the cable path for a given direction. It is particularly helpful that the cable 26 be maintained firmly pressed against that particular pulley so that cable traction can begin correctly without formation of slack inside the traction unit 20. This can be ensured by operating the corresponding traction wheel 54, 60 to exert pressure against the cable 26 and in turn, against the corresponding end pulley 64, 62. For the sake of simplicity, it will be understood herein that the expressions front and rear refer to the normal driving direction of the truck, although it will be understood that the traction unit 20 can be used elsewhere than on a truck, such as on a boat such as a cable ferry for instance, which does not necessarily have a front or a rear, and/or be used directly on the ground, for instance.

In FIG. 2, the arrows show the operation of pulling cable and feeding it into the accumulator 18. In this cable feeding direction, the front end driving pulley 64 is the last in the cable path and corresponds to the exit of the cable. Henceforth, to start the cable traction operation beginning from an unactive state, the front end traction wheel 54 will be used to press a corresponding portion of the cable against the front end driving pulley 64. This will cause the front end driving pulley 64 to effectively "grab" the cable 26, in a manner that its rotation will move the cable 26 and cause the cable to firmly press on the previous pulley in the cable path. The previous pulley in the cable path will then effectively grab the cable and cause the cable to firmly press the previous pulley, and so forth. Once the traction operation has correctly begun, maintaining the front end traction wheel 54 against the front end driving pulley 64 will ensure that the traction continues correctly, and prevents the undesired occurrence of the cable loosening from the front end driving pulley 64. During cable pulling operation as illustrated, none of the other traction wheels need to be applied. The other traction wheels 56, 58, 60 can thus be disengaged or maintained in a disengaged state.

If it is selected to drive the cable 26 in the other direction, i.e. pulling the cable from the accumulator and feeding it out the rear, the last pulley in the cable path is the rear end driving pulley 62. It then corresponds to the exit of the cable from the traction unit. Henceforth, during this mode of operation, the front end traction wheel 54 will be disengaged from the front end driving pulley 64, and the rear end traction wheel 60 will be engaged against the cable and the rear end driving pulley 62 to maintain a corresponding portion of the cable firmly pressed and engaged with the rear end driving pulley.

Figure 3:
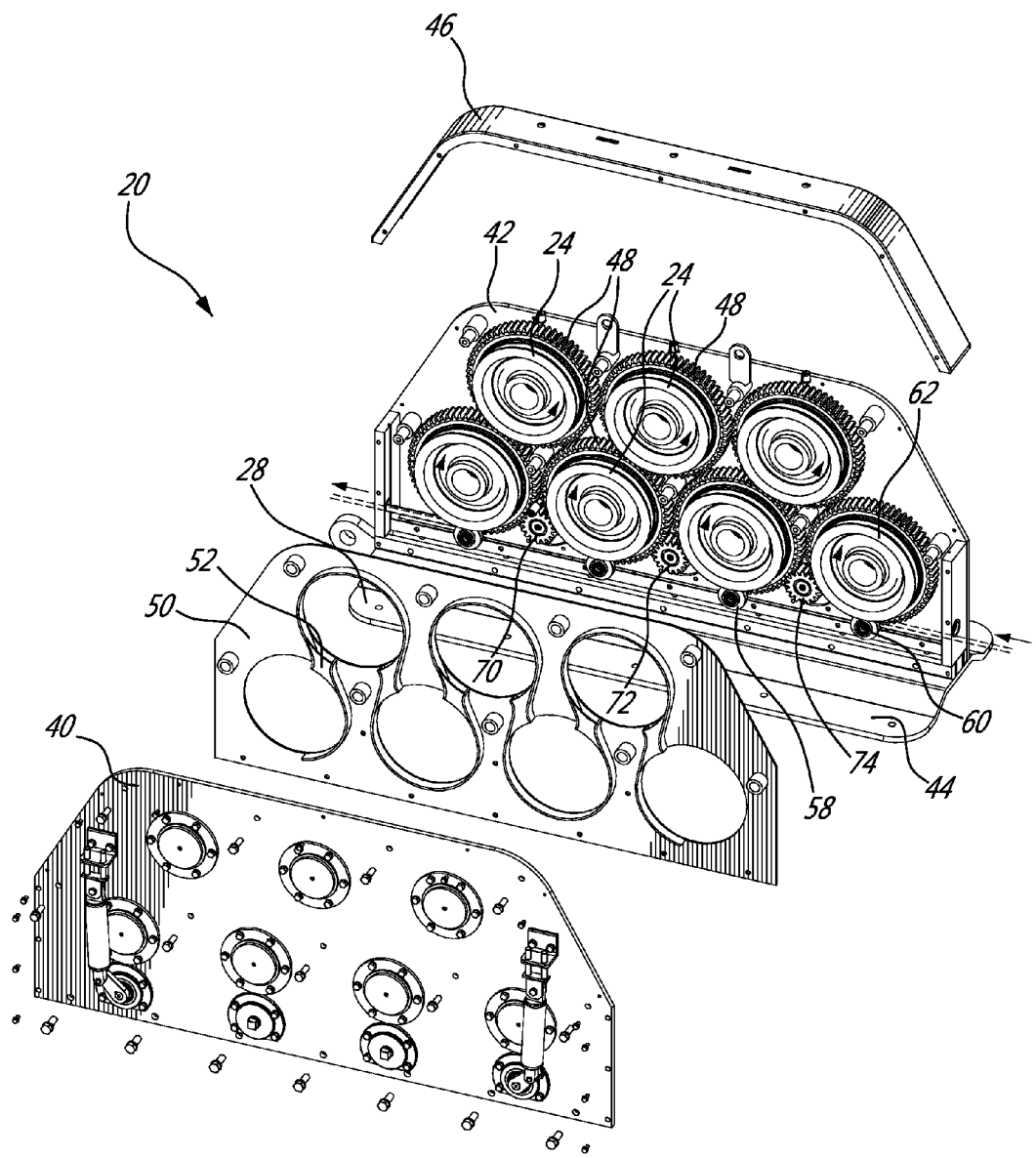
FIG. 3 is an exploded view of the traction unit.

Because the rear end traction wheel 60 and the front end traction wheel 54 are used often and during normal use of the device, and because they can require application of a substantial amount of force, the traction unit illustrated was designed in a manner that they be mechanically activatable. More precisely, as shown in FIGS. 1 and 3, they can be mechanically activatable by way of corresponding hydraulic cylinders connected to the off-centered shafts via a pivot-arm linkage. Alternately, they can be mechanically activated by electric or pneumatic motors for instance, biased into the pressing action by way of a spring, or mechanically activated by any suitable alternate means.

The middle traction wheels 56, 58 are typically only required to cooperate with the cable guide 52 (shown in FIG. 3) in the operation of loading a new cable into the traction unit 20 without disassembling the frame/casing. This does not happen often and is therefore not a routine operation. Nonetheless, it can be carried out relatively easily in the disclosed configuration. To start, a free end of a new cable is pushed into engagement with one of the end driving pulleys (because new cable is entered from the rear in the illustrated embodiment, reference is now made to the rear end driving pulley). At this point, the rear end traction wheel 60 is moved out from interference with the cable path to allow a normal user to push the cable by hand. Once the free end of the cable is positioned between the rear end traction wheel 60 and the rear end driving pulley 62, the rear end traction wheel is moved about its off-centered axis to apply pressure sufficient to correctly engage the cable with the rear end driving pulley 62, and the rear end driving pulley 62 can be operated to rotate, thereby carrying the free end of the cable 26 against the cable guides 52 and thus upwardly and above the second pulley and back down and below the third pulley in the cable path. At this point, it was found that friction with the cable guides 52 could become substantial. Once the free end of the cable is positioned between the second rearmost traction wheel 58 and the third pulley, the second rearmost traction wheel 58 is engaged to press the cable into engagement with the third pulley. Upon activation of the driving pulleys, the engagement of the cable with the third pulley then suffices to bring the cable to the next traction wheel, and so forth. Once the cable has been completely loaded through all the driving pulleys of the cable path, normal operation can resume. In the particular embodiment illustrated, because the middle traction wheels 56, 58 are only used when loading a new cable, they were made to be manually activatable. To move one of the traction wheels against the corresponding pulley, the off-centered bushing of the corresponding wheel, ending with a bolt head, can be rotated using a wrench or the like.

It will be noted here that intermeshed gears are used in this embodiment to generate the collective rotation speed and therefore the synchronized movement of the pulleys. It will be noted here that in this particular design configuration, it was elected to use a drive motor for each one of three pinion gears which interconnect adjacent, same-direction gears. This contributed to spread the forces exerted by the hydraulic drive motors over a greater number of gear teeth. As those skilled in the art will readily understand, other intermeshed configurations are possible.

One will note that a number of 7 pulleys is used in this embodiment. It is believed that this number allows to achieve the traction force required for many applications without wasting resources. A total of 8 pulleys may be preferred in certain applications. The particular traction unit described above and illustrated has a 25 000 lbs capacity. It can be used with cable having 54 000 lbs capacity, for instance which can have ¾ inches for example. It is likely that to adapt to a greater capacity, for example, larger pulleys will be required, but the number of pulleys can likely remain the same. Nonetheless, in alternate embodiments, a different number of pulleys can be used, such as 5 or more pulleys for instance.

It will be noted that the traction unit can be used in applications other than in combination with a cable accumulator.

In this particular embodiment, a leading pulley 27 is used at the rearmost portion of the truck, to change the orientation of the cable 26 to the vertical. This is simply a design preference adapted to exerting a pulling force upwardly. Also noted here is that the size of the pulleys are typically selected as a function of the size of the cable. So most of the system can simply be scaled to adapt to larger cable sizes.

Due at least partially to the relatively high amount of coiling of the cable by the winding design of the path and the plurality of cable-driving pulleys used, a substantial amount of force can be exerted onto the cable by the traction unit 20. The speed and force at which the cable-driving pulleys 24, 62, 64 are operated can be varied by an operator. Nonetheless, it is useful during use to be able to obtain a measure of the tension in the cable. For instance, if the cable 26 becomes blocked, having an indication that the tension in the cable has reached a threshold value can allow to either sound an alarm or other indicator, and/or automatically shut down the system.

Still referring to FIG. 2, it will be understood that when pulling cable to coil it in the accumulator 18, the force exerted on the cable is the strongest between the traction unit 20 and the leading pulley 27, because at that point, the tension in the cable is the sum of the tension imparted by each one of the cable driving pulleys. A strong reaction force in the cable effectively "pulls" the traction unit 20, or more particularly the frame 28 thereof on which the cable-driving pulleys 24 are rotatably mounted, in the direction of the leading pulley 27. Because the section 30 of the cable between the traction unit 20 and the leading pulley 27 is close to horizontal, the tension in the cable section 30 tends to exert a sliding force on the traction unit 20 moving it toward the rear. To harness this force in a manner to allow its measure, it was elected in the illustrated embodiment to mount the frame 28 to the bed 12 of the truck using a mount 32 which allowed the transmission of force to the forward end 34 of the traction unit 20. In this particular embodiment, this was achieved by mounting the frame 28 to the bed 12 of the truck via a bushing 36 of elastomeric material (consisting more particularly a number of discrete rubber bushings). The frame 28 of the traction unit is then connected to a transversal shaft 38 which is firmly affixed to the bed 12 of the truck (as shown in FIG. 1). A cable force sensor, which can be a strain gauge load cell for example, can then be applied to the transversal shaft 38 to obtain an indication of the tension in the portion 30 of the cable extending between the cable traction unit 20 and the leading pulley 27 by measuring the deformation in the transversal shaft 38 using the strain gauge load cell. Other cable force sensors can be used in other applications. The signal obtained from the cable force sensor can effectively be used by the controller unit 22. For example, the real-time value can be displayed for the operator, the variation of value over time can be recorded in memory to allow its subsequent use, and/or the controller can continuously compare the value to a threshold and react if the value equals or exceeds the value.

It will be noted that in this embodiment, the portion of the cable 30 exiting the cable traction unit leading to the pulley 27 is straight along an axis which is oriented toward the transversal shaft 38 and which is aligned roughly 5° off the horizontal.

Turning now to FIG. 3, an exploded view of the cable traction unit is shown, and illustrates more components. First, it will be noted that the cable-driving pulleys are mounted on axles which are rotatably mounted in a frame 28 provided in the form of a casing, comprised of two opposite wall plates 40, 42, connected to a base 44, and covered by a cover 46. Behind the pulleys 24, one can see a plurality of gears 48. In fact, in this specific embodiment, each one of the pulleys 24 doubles up as an adjacent gear 48 which shares its axle. As will be seen more clearly below, the gears 48 are intermeshed so that each cable-driving pulley 24 is driven at the same cable-driving speed. The gears typically require lubrication, and the cable can accumulate dirt, water and grime. Therefore, it is better to keep the dirt and grime away from the gears and to keep the lubrication inside the gears. Using a center plate 50 to act as a wall between the pulleys and the gears can be useful to this effect. Another feature which is visible from FIG. 3 is that a cable guiding channel 52 is formed between the gears by a plurality of cable guides which in this case are made integral to the center plate 50. Further, the center plate 50 and the side plate 40 of the frame 28 can act as walls which prevent the cable from escaping transversally. It will appear to those skilled in the art that using the illustrated configuration, and in the light of the description which will be given further below, that a new cable can be loaded into the traction unit without disassembling the frame/casing, beginning by entering a free end of a cable at one end, and result in the cable following the cable guiding channel 52 along the entire cable path. The cable guides are mounted to the center plate in this embodiment.

Figure 4:
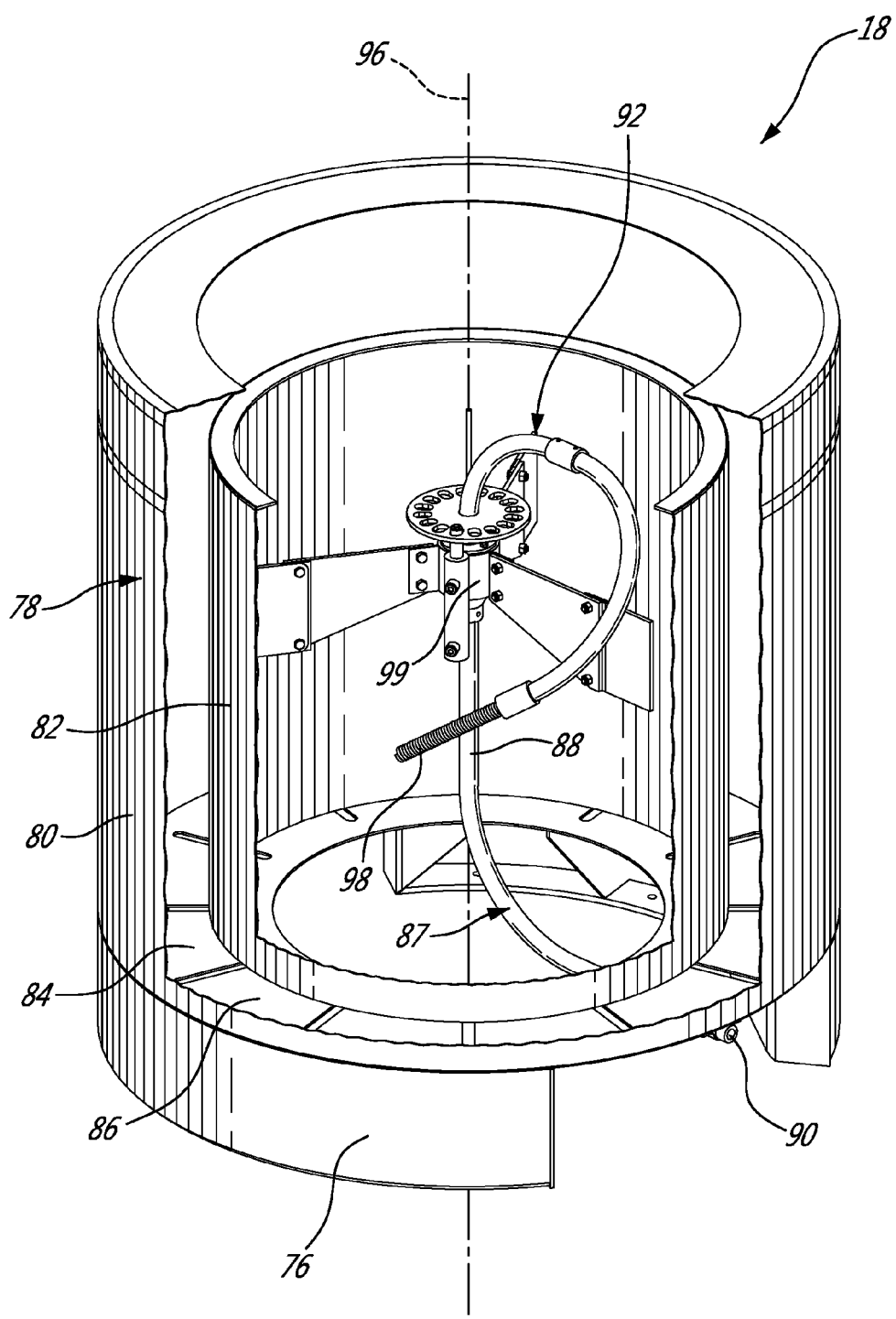
FIG. 4 is a perspective view, fragmented, of an accumulator unit of the cable handling system of FIG. 1.

Finally, referring to FIG. 4, the cable accumulator unit is shown. The accumulator unit 18 has a base 76 which can be fixedly mounted to the bed 12 of the truck (FIG. 1). It has a cable chamber 78 which includes a cylindrical outer wall 80 which is concentric with a cylindrical inner wall 82, both of which are fixed in position relative to the base 76. An annular cable receiving area 84 is present therebetween, above a cable-supporting floor 86. In this embodiment, the cable-supporting floor 86 is apertured to allow avoiding accumulation of water being brought inside by the cable.

A cable channel 87 is also provided. In this embodiment, the cable channel 86 has a fixed section 88 provided here in the form of a rigid metal tube. This fixed section 88 has a first end 90 of the cable channel 87, which is fixedly positioned and oriented toward the cable traction unit 20, to communicate cable therewith (see FIG. 2). In this particular embodiment, the fixed section 88 passes underneath the annular cable receiving area 84 and penetrates inside the cylindrical inner wall 82 from below. It is fixedly mounted inside the cylindrical inner wall 82 at a position where it communicates with a rotary section 92 also provided here in the form of a tube. The rotary section 92 is mounted on a rotary bearing 94 inside the cylindrical inner wall, so as to rotate freely about a vertical axis 96, above the annular cable receiving area 84. In this embodiment, the rotation axis 96 of the rotary section 92 coincides with the common axes of the cylindrical inner 82 and outer 80 walls. The rotary section 92 can have a flexible end section 98 to provide additional flexibility. In this embodiment, the flexible end section 98 is made of a metal spring, but a flexible hose can be used as well, for instance.

During operation, cable which is pulled into the cable traction unit 20 from the rear, is fed into the cable channel 87 in which it travels until it is outputted into the cable chamber 84 of the accumulator unit 18. As cable accumulates in circles on the floor, in the annular area 84, and it continues to be outputted, the stress in the cable acts to rotate the rotary section 92 about its axis 96 allowing it to coil in a relatively natural manner.

As the rotary section is pushed into rotation by the cable, it optionally rotate a visual indicator which indicates to the operator that the operation is functioning correctly.

When cable is fed out at the rear of the truck, the cable driving pulleys are operated in the opposite direction, and the tension created in the cable by pulling it from the accumulator unit effectively rotates the rotary section 92 of the cable channel 87 in the other direction. For indicative purposes, the accumulator described above and illustrated can house one mile of ¾" cable (1.5 km).

Experiments have shown that in this particular embodiment, the cable could tend to unevenly coil if the annular spacing 84 between the two cylindrical walls 80, 82 was too wide. The proportions shown in the illustration, of a radius of the internal cylindrical inner wall 82 roughly 2.5 times the width of the annular spacing 84, has been found satisfactory for this embodiment.

It will be noted that the cable accumulator 18 can be used in applications other than in combination with a traction unit, and if used with a traction unit, it can be used with a different traction unit than the one described above and illustrated.

As it will be understood from the above, the embodiments described above and illustrated are provided for the purposes of illustration. Many variants are possible. The scope is thus indicated by the appended claims.

What is claimed is:

1. A cable handling system for a vehicle, the cable handling system comprising:

a cable traction unit having a sequence of cable-driving pulleys disposed on a common plane, a cable path coiling partially around each one of the cable-driving pulleys in the sequence, also having two end traction wheels, each one being adjacent to a corresponding endmost one of the cable-driving pulleys in the cable path and movable to press the cable thereagainst for traction, the cable traction unit being mounted on a rear portion of the vehicle, the sequence of cable-driving pulleys also having a plurality of intermediate pulleys between the endmost ones of the cable-driving pulleys in the cable path, wherein the cable path coils around more than half the circumference around each of the intermediate pulleys;

a cable accumulator unit mounted on the vehicle, having an cable chamber fixed relative to the vehicle and having an annular cable receiving area between a cylindrical outer wall and a cylindrical inner wall, and a cable channel having a first end communicating with the cable traction unit, and a second end communicating with the annular cable receiving area wherein the cable traction unit has a frame onto which the cable-driving pulleys are rotatably mounted, the frame being connected to a cable force sensor at a front end thereof, further comprising a mount freely connecting the frame to the vehicle, in a manner allowing resistance to the cable force exerted by the sequence of cable-driving pulleys during operation of the system to be transferred to the cable force sensor via the frame.

2. The cable handling system of claim 1 wherein the mount includes elastomeric material supporting the weight of the force-transmitting assembly on the vehicle.

3. The cable handling system of claim 1 wherein the cable channel has a rotary section allowing free rotation of the second end of the cable channel above the annular cable receiving area, the rotary section being rotatable about an axis common to the cylindrical outer wall and the cylindrical inner wall.

4. The cable handling system of claim 1 wherein the cable accumulator unit is positioned immediately in front of the cable traction unit, at the rear of the vehicle.

5. The cable handling system of claim 1 wherein the sequence of cable-driving pulleys includes at least 5 pulleys.

* * * * *